March 14, 1944.   C. FINCH   2,344,401
HORSESHOE TYPE MOTOR
Filed Sept. 22, 1941
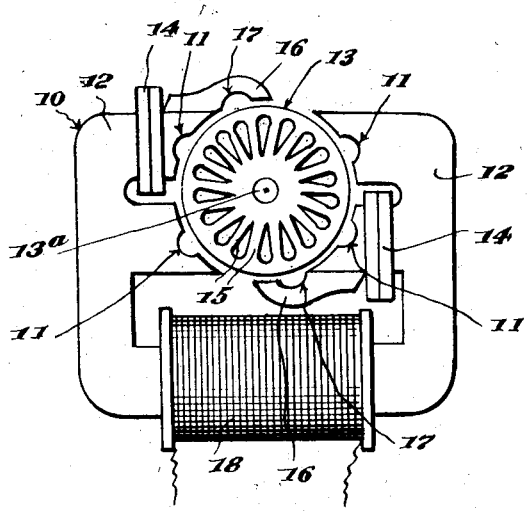
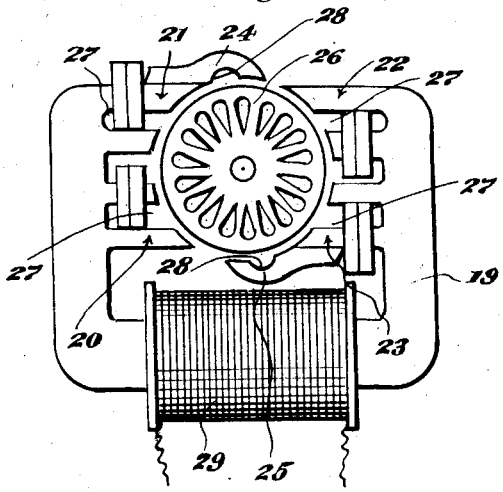
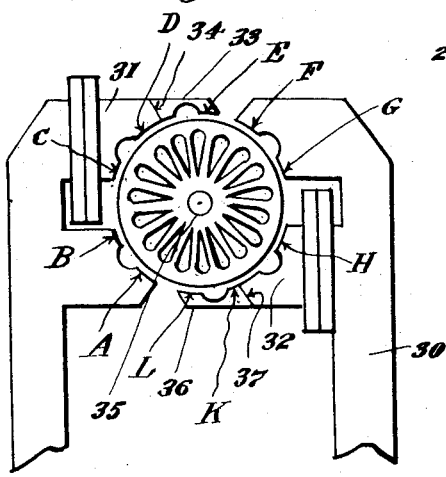
Inventor
CLARK FINCH
By Irving A. McCathran
Attorney Patented Mar. 14, 1944

2,344,401

UNITED STATES PATENT OFFICE 2,344,401

HORSESHOE TYPE MOTOR

Clark Finch, West Palm Beach, Fla.

Application September 22, 1941, Serial No. 411,910

1 Claim. (Cl. 172—278)

This invention relates to horse-shoe type motors, and constitutes an improvement upon the structure shown and described in my previous application filed August 30, 1940, Serial Number 354,884, wherein I have added a change in the field arrangement so as to give added power to the motor.

One of the important objects of this invention is the production of an extension which is attached to, or forms a part of the field magnet to provide extra power and efficient control for the motor.

A further object of this invention is the production of an efficient extension for the field magnets of a motor which may be easily adjusted for efficient operation of the motor.

Other objects and advantages of the present invention will appear throughout the following specification and claim.

In the drawing:

Figure 1 is a side elevational view of a two-pole motor;

Figure 2 is a side elevational view of a four-pole motor;

Figure 3 is a side elevational view of a modified type of motor.

By referring to the drawing, and particularly to Figure 1, it will be seen that 10 designates a field magnet of a conventional horse-shoe type. In connection with this type of magnet, I provide notches 11 in each half of each pole 12. These notches are on the adjacent face of the poles near the periphery of the rotor 13, the rotor 13 being rotatably mounted upon the shaft 13ᵃ in the conventional manner between the poles 12. The conventional short-circuiting rings 14 are mounted upon certain poles of the magnet 10 in the conventional manner.

The rotor 13 is of the same construction as that set forth in my application Serial Number 354,884, the spokes 15 being properly spaced to properly synchronize and operate in connection with the field magnet 10. The rotor 13 must be carefully made as to weight, design and proportion, and the field magnets must be adjusted carefully to suit the proportions of the motor to get the best results.

As shown in Figure 1, an extension 16 is added to each pole so as to provide one extension in an overhanging position relative to the rotor 13 and a second extension in an underlying position, each extension 16 is provided with a notch 17. These extensions 16 are added to the poles of the conventional magnet 10 and therefore may be easily adjusted and will remarkably strengthen the effect upon the rotor 13. As shown, the magnet 10 carries the conventional coil 18.

In Figure 2, there is shown a four-pole motor having a field magnet 19 with four poles 20, 21, 22 and 23. Extensions 24 and 25 are carried by the poles 21 and 23, one extension overhanging the rotor 26 and the other extension underlying the rotor 26. The four poles are notched, as at 27, and the extensions 24 and 25 are notched, as at 28. A coil 29 is carried by the field magnet 19, as shown.

In Figure 3 there is shown a field magnet 30 having poles 31 and 32. An extension 33 is secured to the tip of the upper prong of the pole 31, as at 34, to overlie the rotor 35 and an extension 36 is secured to the tip of the lower prong of the pole 32 so as to underlie the rotor 35.

It should be noted that I provide a special field for a 400 R. P. M. motor using an 18 spoke rotor having nine spokes against each arm of the field magnet. Each arm of the field magnet has five active or projecting points corresponding with alternate spokes of the rotor. Two of these active points are on the unlagged or receiving half of each arm, and the remaining three points are on the forwarding or lagged half of each arm of the field magnets. The two field arms are spaced one spoke gap apart at the top and bottom of the rotor.

The present construction is arranged for 400 R. P. M. motor, with a rotor having eighteen spokes. Each arm of the field magnet is arranged so that its active points meet alternate spokes, and this leaves one spoke gap between right and left arms of the field magnet—note Figure 3. As it will be noted in detail in Figure 3, the lower prongs A and B of the pole 31 of the magnet are the receiving prongs and constitute two active points which come near to the rotor 35 and of course act upon it. The upper prongs C, D and E constitute active points. The point E on the forwarding tip gives the necessary added power. On the right arm or pole 32, the upper prong has two active points F and G, and the lower prong has three active points H, K and L.

In actual tests made by me, I made the extensions during my experiments moveable, and by removing the extensions and placing them on opposite arms so that they pointed against the rotation of the rotor, it was found that they would weaken the action of the rotor so that the rotor could barely attain synchronous speed. Consequently, it has been found that the extensions drive in the directions in which they point. The rotor in the forms shown in the drawing will therefore rotate in a clockwise direction. Without the extensions, the rotor had to be made to exact proportions and adjusted with great care to attain desired results requiring therefore a very tedious procedure. With the extensions which I now am employing, however, it has been found possible to utilize motors which have been previously discarded and by adding the extensions and making the proper adjustment of the extensions which now may be easily accomplished, excellent results have been obtained. The important feature therefore of the invention, is that of adding the extensions to the poles of the field magnet and to point these extensions in the direction of rotation, thereby adding considerable power to the motor.

It should be understood that certain detail changes in the construction may be employed without departing from the spirit of the invention so long as such changes fall within the scope of the appended claim.

Having described the invention, what I claim as new is:

A self-starting synchronized motor of the 400 R. P. M. style comprising a field magnet of a conventional horse-shoe type having opposed poles, a rotor mounted between and adapted to rotate between the poles, each pole having a notch formed in the face thereof adjacent the rotor, the rotor having a plurality of radiating spaced spokes to properly synchronize and operate in connection with said field magnet, an extension carried by each pole, one extension being located in an overlying position and the other extension being located in an underlying position relative to said rotor, the extension being adapted to be fixed in an adjusted position to create a maximum effect upon said rotor, each extension having a notch upon its face adjacent the rotor, said notches of said extensions and poles being spaced to match the spokes of said rotor, each pole and its extension spanning a distance of one-half of the number of spokes of the rotor, the poles and extensions thereof each constituting a field arm, the field arms being spaced one spoke gap apart at the top and bottom of the rotor, and each field arm of the field magnet being arranged so that its active points meet alternate spokes of the rotor.

CLARK FINCH.